June 2, 1936.                    R. C. RUSSELL                    2,042,967
                          INTERNAL COMBUSTION ENGINE
                            Filed June 22, 1932           2 Sheets-Sheet 1
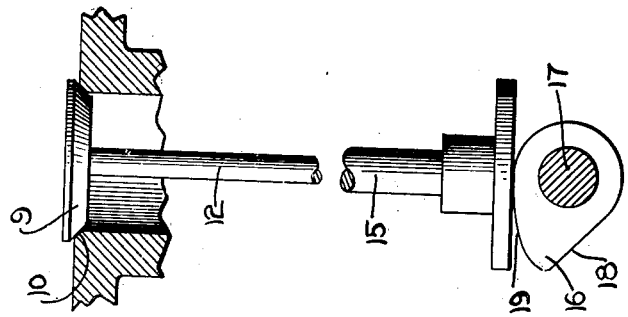
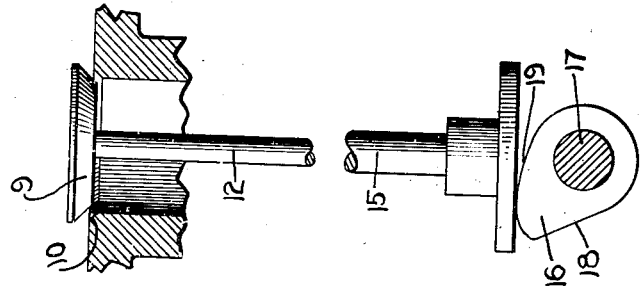
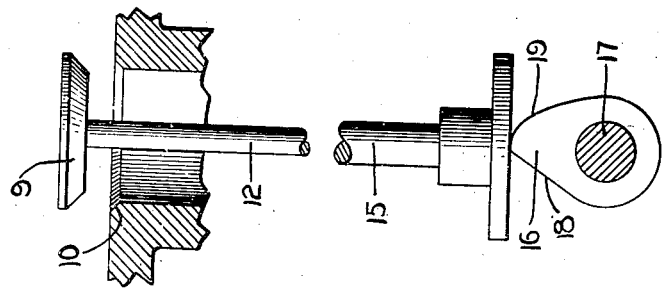
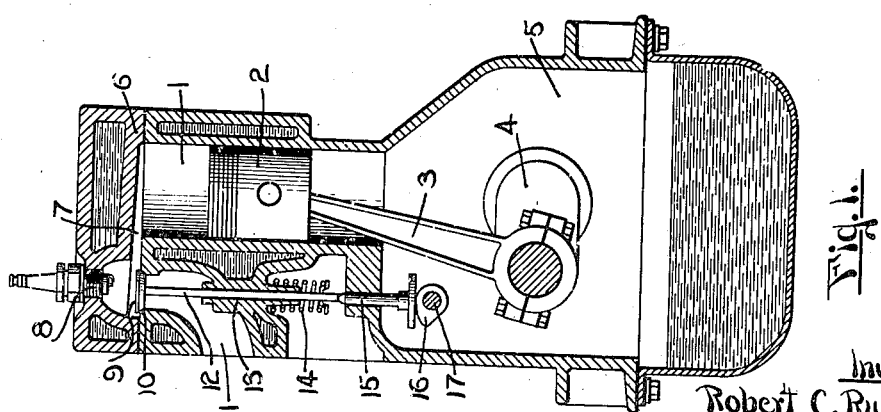
Inventor
Robert C. Russell
Attorneys

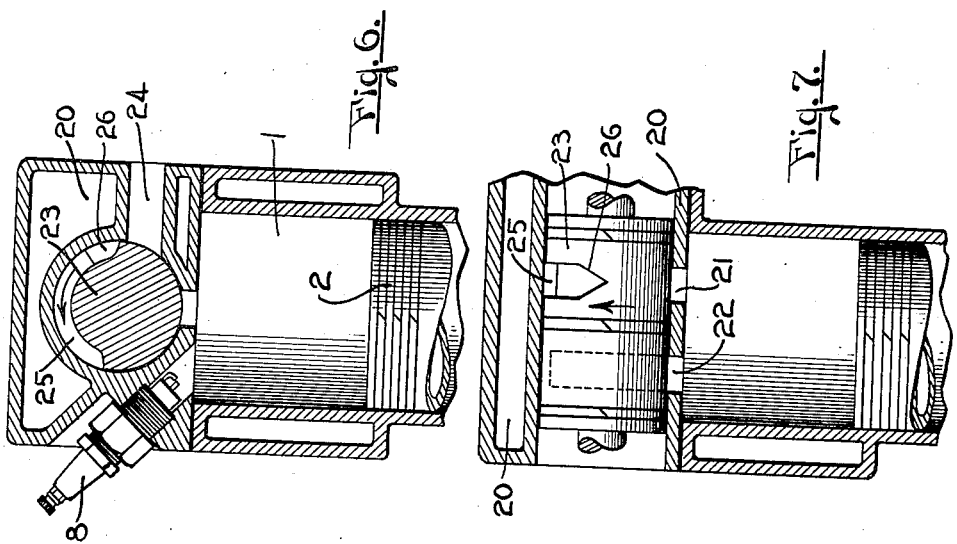
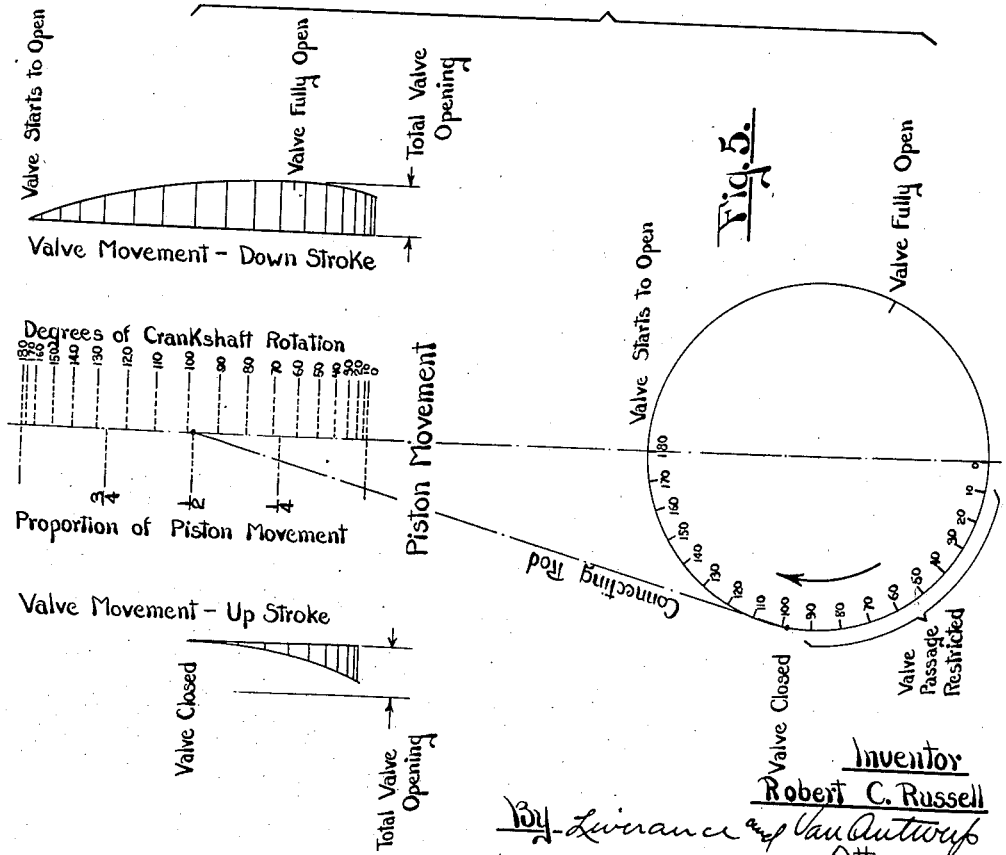

Patented June 2, 1936

2,042,967

UNITED STATES PATENT OFFICE 2,042,967

INTERNAL COMBUSTION ENGINE

Robert C. Russell, Dallas, Tex., assignor to Engineering Corporation, Grand Rapids, Mich., a corporation of Delaware Application June 22, 1932, Serial No. 618,766

1 Claim. (Cl. 123—75)

This invention relates to improvements in internal combustion engines and more particularly to such engines of the reciprocating piston, four-stroke cycle type and is a continuation of my co-pending patent application filed March 7, 1931, Serial No. 520,827. Its object is to provide a mechanism and a method of operation fundamentally for the purpose of operating the engine with greater fuel economy and to enable the engine to operate more efficiently at high speed and attain greater efficient speed than has heretofore been done with engines of this type.

This invention deals particularly with four-stroke cycle engines, or more commonly called four-cycle engines, of the high compression type wherein the compression chamber is decidedly small in comparison with the piston displacement. In prior four-cycle high compression engines difficulty has been experienced in designing an engine which would have the desired degree of compression of the charge and which would not "knock" or detonate under certain working conditions and at certain speeds. Trouble has also been experienced in designing an engine which would receive sufficient charge of gas to compe-tently compress to the desired degree at high speed.

Engines as designed in the past have necessarily been in the nature of a compromise between various desirable features, each of which would operate practicably at certain speeds and under certain conditions but which would be objectionable at other speeds and other conditions and therefore it had been necessary to combine the desirable details but to modify each to an extent where its objectionable function would not be too pronounced to be acceptable and the result had been only an approximation or compromise of that sought for.

In the present invention a mechanism and a method of operation makes possible the use of a four-cycle engine having an extremely small compression chamber but obviating the objectionable qualities resulting from such small compression chamber in a high compression engine present in previous structures. A fundamental difference between the present invention and former types is that in combination with the very small compression chamber, the intake valve operating mechanism is arranged to operate said valve so that it will close gradually from the beginning of its closing movement to its full closed position and will delay the complete closing of the valve until the piston has traveled a material portion of its compression stroke which position may be approximately stated as at half of the travel of the compression stroke.

The valve operates in this manner at all times and during all speeds and working conditions resulting in extreme fuel economy and efficient high speed operation and smoothness of operation with absence of detonations at any speed. At lower engine speeds a portion of the full charge of gas taken into the cylinder by the suction stroke of the piston is expelled through the intake valve during the first portion of its compression stroke while the intake valve remains open and although a smaller amount of fuel is trapped in the cylinder and eventually compressed and burned than is customary, the extremely small compression space causes the desired degree of compression to be attained before ignition and results in efficient and economical operation at lower speeds. As the engine speed increases the loss of a portion of the charge through the partially open intake valve is diminished by reason first of the restricted area of valve opening which is partially closed during the first part of the upstroke of the piston and also because of the inertia of the gas which resists a quick change of direction of movement. Furthermore the laws governing the flow of gases having effect under these conditions as the flow of gas does not increase in direct ratio to the increase in pressure. At the extremely high engine speeds practically none of the fuel charge is expelled through the intake valve for the reasons heretofore mentioned namely the restricted valve opening and the inertia and flow of the gas and furthermore, because at extremely high speeds the cylinder does not obtain a full charge of gas at atmospheric pressure but the charge is in a state of partial vacuum which tends to return to atmospheric pressure before attempting to escape from the cylinder. Therefore, as the speed of the engine increases the conditions of the charge in the cylinder are automatically, inherent to the functioning of this invention, governed to produce the most effective results in the operation of the engine.

The mechanism embodying the invention and the method of operation are hereinafter more fully described and particularly pointed out in the claim reference be had to the accompanying drawings, in which, Fig. 1 is a vertical section through the cylinder and intake valve of an engine of the poppet valve type embodying this invention.

Figs. 2, 3 and 4 are fragmentary sections with parts broken away showing the intake valve and cam in various positions.

Fig. 5 is a diagram graphically illustrating the movement of the intake valve relative to the movements of the piston and crankshaft of the engine.

Fig. 6 is a cross section of the upper portion of an engine structure embodying this invention showing the utilization of a rotary valve, and Fig. 7 is a section of the same structure illustrated in Fig. 6 taken longitudinally of the axis of the rotary valve and illustrating the shape of the intake passage in the valve.

Like reference characters refer to like parts in the different figures of the drawings.

The poppet valve type of engine illustrated in Fig. 1 is conventional in most respects and comprises a cylinder 1, a piston 2, a connecting rod 3, a crankshaft 4 and a crank case 5. The aforementioned parts may be of wholly conventional structure and the engine also is provided with a wholly conventional exhaust poppet valve and means for operating the same and other elements of structure common to engines of this general type. A cylinder head 6 is located to cover the upper end of the cylinder 1 and is provided on its lower surface with a chamber 7 communicating with the upper end of the cylinder and also extending over the valves, and particularly the intake valve as shown, and this chamber is of exceptionally small size and, in combination with whatever portion of the upper end of the cylinder which is not occupied by the piston at the top of its stroke, forms the compression chamber in which the fuel charge is compressed. A conventional spark plug 8 is located with its electrodes exposed within the compression chamber.

The inlet valve 9 engaging a valve seat 10 governs communication between the inlet passage 11 and the compression chamber 7 and cylinder 1. The valve 9 is of conventional shape and construction either of the 45° type as shown or of the 30° type often used, and is provided with a stem 12 extending through a valve stem guide 13 and a valve spring 14 is connected to the valve stem below the valve stem guide and tends to thrust the valve 9 against its seat 10. The lower end of the valve stem 12 is engaged by a valve tappet 15 which tappet extends into the crank case 5 of the engine and is operated upon by an intake valve cam 16 fixed to a cam shaft 17. The cam shaft 17 is rotated by suitable conventional mechanism in the same manner as is customary in four-cycle engines at half the speed of the crank shaft 4 whereby the cam shaft 17 and its cam 16 are caused to make one half complete revolution during the time in which the piston 2 completes a movement from the top of the cylinder to the bottom thereof and back again to the top.

As so far described the engine is no different from previous poppet valve four-cycle engines excepting that the compression chamber is much smaller than has heretofore been practical for commercial use. In this invention the volume of the compression chamber may be substantially 1/7 or 1/8 of the volume of the cylinder and combustion chamber combined. With reference to the intake valve cam 16 it may also be said that its valve opening surface is of conventional shape which is designed to operate upon the tappet 15 to lift the valve 9 its fullest extent from the seat 10 as rapidly as may be possible in accordance with good engineering practice. However, the valve closing surface of the cam 16 is designed quite differently than has been common for intake valves and it is shaped to permit the valve 9 to close under action of the valve spring 14 gradually and to complete the closing at a time much later in the engine's cycle of operations than has heretofore been done.

Referring to Fig. 5, which is a diagrammatic disclosure, the circle indicates the rotation of the crank shaft while the fixture immediately above illustrates the movement of the piston in the cylinder and the broken line joining them represents the connecting rod between the crank and the piston. The illustration at the upper right shows the intake valve movement and illustrates its respective positions corresponding to the positions of the piston in the cylinder during the down stroke or suction stroke of the piston and the illustration at the upper left is a continuation of that at the upper right and shows the relative positions of the valve corresponding to the positions of the piston in the cylinder during the up-stroke or compression stroke. By referring to the upper right hand figure it will be seen that the valve starts from fully closed position at approximately the top of the suction stroke of the piston and has a rapid opening initial movement and attains its full open position considerably before the piston has reached the bottom of the suction stroke. This opening movement of the valve is the ordinary movement in conventional engines. After the valve has attained its fullest open position it is held practically so during a small additional downward movement of the piston but before the piston has completed its suction stroke the valve commences its closing movement. This closing movement is caused to be more gradual than the opening movement and it continues through completion of the down or suction stroke of the piston and throughout approximately half of the up stroke or compression stroke of the piston causing the valve to be partially open but with a gradually restricted passage while the piston is moving upward on the compression stroke substantially half of its travel.

Fig. 2 shows the intake valve open to its fullest extent and shows the cam 16 engaging the tappet 15 at the point of the cam. The lifting surface 18 of the cam is substantially flat which causes the valve to open rapidly which is of the conventional shape. The closing surface 19 of the cam is convex and it extends through a greater circumference of the cam than is customary. This convex surface 19 causes the valve to close slowly and it is so designed that the closing movement of the valve continues gradually and diminishingly from its beginning to its end or fully closed position. Fig. 3 shows the cam with the valve at partly closed position illustrating the restricted valve opening and Fig. 4 shows the valve fully closed with the cam at the point of valve closing.

It should here be explained and fully realized that the cam and cam shaft movement does not correspond with the piston movement. The cam rotates uniformly while the piston varies its speed throughout its stroke commencing from a rest position and gradually increasing its speed to approximately mid-stroke and then gradually decreasing its speed to rest position at the end of its stroke. In this invention the intake valve has its closing movement extending to the period when the piston has its greatest speed of movement, namely, at substantially mid-position on the up stroke and at this period of operation the piston is moving much more rapidly relative to the cam movement than it does at earlier portions of its stroke. Therefore it will be understood that the cam must be designed with relation to piston travel and not with relation to cam shaft rotation and it is also to be understood that the essential valve movement herein concerns valve movement relative to piston travel and piston position as distinguished from degrees of rotation of either the crank shaft or the cam shaft.

The engine having the rotary valve illustrated in Figs. 6 and 7 has the same type of cylinder 1, piston 2 and other parts common to such engines and its cylinder head 20 is provided with inlet and exhaust ports 21 and 22 communicating with a rotary valve 23. An intake passage 24 and an exhaust passage, not shown, also communicate with the rotary valve 23 and the same valve has an intake valve passage 25 and an exhaust passage, not shown, which register with the respective ports and passages at certain portions of the rotation of the valve 23 to by-pass gas between them.

The valve 23 is rotated by conventional means provided for valves of this type in synchronism with the operation of the motor and the length and shape of the valve passage 25 are so designed as to provide a valve opening communicating between the intake passage 24 and the cylinder 1 corresponding both in times of opening and closing and graduations of the extent of the openings with that accomplished by the poppet valve heretofore described. In other words, the rotary valve accomplishes a comparatively rapid intake valve opening beginning at approximately the top of the suction stroke of the piston and gradually closing the intake passage throughout substantially one-half of the return or compression stroke of the piston at which point the intake passage is completely closed. To enable the rotary valve to accomplish the gradual closing of the valve opening the end of the valve passage 25 is tapered in any suitable manner as at 26, this being one method of accomplishing the result although other specific mechanical construction may be substituted therefor.

Different types of valves or valve operating mechanism other than herein illustrated and described may be utilized, as for example the so-called sleeve valve to accomplish the same intake valve function which is essential to the operation of the engine, namely, a substantially conventional intake valve opening but a delayed and preferably gradual valve closing resulting in an increasing restriction of the valve passage extending from a point approximating the lower position of the piston and extending through substantially half of its compression stroke at which point the valve completely closes.

Operation

It is to be understood as heretofore stated that the engine embodying this invention comprises conventional essentials not shown nor specifically described such for example as an exhaust valve and means for operating it in the customary manner. It is also to be understood that the cam shaft 17 is provided with conventional means for rotating it at half the speed of the crank shaft. Customary ignition timing mechanism is utilized together with a conventional source of electricity for such ignition and of course a carburetor or other means for supplying combustible gas to the intake passage 11 is provided.

Beginning the description of the operation at the commencement of the intake stroke and assuming that the engine is operating at relatively low speed, the piston is at the top of the cylinder and commences its downward stroke and at the same time the intake valve 9 begins to open and rapidly opens during the downward movement of the piston. The piston creates a suction in the cylinder as it travels downward which suction draws gas into the cylinder through the open intake valve from the passage 11. At low engine speeds the opening in the valve will permit gas to enter the cylinder approximately as fast as the piston displacement requires it and when the piston has reached the bottom of its suction stroke the cylinder will contain a full charge of gas at substantially atmospheric pressure.

As the piston begins its upward movement the charge in the cylinder reverses its direction of travel and commences to eject through the valve 9, which at this time is partially closed but still sufficiently open to permit ejection of gas from the cylinder at slow speeds, and if the engine were run slowly enough the charge retained within the cylinder at the point when the valve completely closed at approximately half of the return stroke of the piston would be approximately half of the charge contained when the piston was at the bottom of its suction stroke.

However, in practical operation with throttle open and load to hold motor speed comparatively low, the motor will have a piston movement too fast to permit ready passage of the gas through the restricted valve opening on the up stroke of the piston and therefore it is estimated that at normal idle running or slow speed of the engine approximately 30% of the full charge is ejected while 70% remains in the cylinder after the valve is closed to be compressed in the small compression chamber 7.

After being compressed by continuation of the compression stroke the charge is ignited in the customary manner causing it to burn rapidly to force the piston downwardly on its working stroke after which the exhaust valve opens to permit exhaust of the burned gas and later the exhaust valve closes in the ordinary manner of four-cycle engines. It is to be understood that the ignition is arranged to occur at a point considerably prior to the so-called top center of the compression stroke or in the usual manner.

By thus permitting a considerable portion of the original charge drawn into the cylinder by the suction stroke of the piston to be ejected during the first portion of the up stroke of the piston at slow engine speeds the remaining charge, which is trapped in the cylinder by closing of the intake valve and subsequently compressed in the small compression chamber, is not so great as to cause over-compression detonation upon being ignited. Furthermore, the gas which is so expelled returns into the intake passages of the engine for future use and is not wasted which serves for considerable fuel economy in operating the engine. Furthermore this ejection of gas into the intake passages causes a turbulence or agitation of the gas which intensifies its homogeneousness and is desirable.

As the speed of the engine increases the ejection of gas from the cylinder on the up stroke of the piston diminishes therefore creating some compression before the intake valve is closed. The diminishing of the ejection of gas is caused both by its inability to move rapidly through the restricted valve opening, which valve opening during this part of the engine's operation is less than during the suction stroke, and also because of the inertia of the gas which, after having attained considerable velocity of movement in entering the cylinder resists rapid change of direction of movement to be ejected therefrom. Also the law governing the flow of gas under pressure through a small orifice has its effect. These tendencies to prevent ejection of the gas increase with the increase of the speed of operation of the engine.

At extremely high speeds it is assumed that there will be no ejection of the charge whatever. This is caused by the aforedescribed resistance of the gas to movement through a restricted passage the inertia and compressability of the gas and to these are added a partial vacuum within the cylinder during the first portion of the compression stroke. The extreme high speeds and the inertia of the gas bodily combined with the limited opening of the valve even when it is at its greatest open position will not permit gas to enter the cylinder as fast as the piston displacement therein occurs and therefore a partial vacuum will be formed which tends first to return to atmospheric pressure during the first portion of the compression stroke.

It will also be realized that at high engine speed, when a considerable vacuum exists in the cylinder at the bottom of the suction stroke, and also the incoming gas has attained high velocity and considerable inertia, the vacuum will tend to be satisfied and inertia will cause the gas to continue to flow through the intake valve while the piston is actually moving upward on its compression stroke and, at extremely high speeds it is estimated that gas will continue to flow through the intake valve during the entire period it is open.

Therefore at high engine speeds, although it is admitted that a full charge of gas cannot be admitted to the cylinder, none of the gas which has entered will be ejected and because of the extremely small compression chamber the partial charge retained will be sufficient to provide the desired degree of compression requisite for proper and efficient engine operation.

In considering the valve opening and closing positions it must be understood that wherein it is stated that the valve is open or closed at a certain time it is meant that it is opened sufficiently to permit an appreciable flow of gas or is closed sufficiently to prevent such appreciable flow. There have been engines designed with cams shaped to very gradually lift the valve from its seat or lower onto its seat at the beginning and end of the valve movement, such gradual opening and closing movements extending through a considerable cam and crankshaft-rotation but this arrangement has been for the purpose of providing a "soft" cam and valve movement and the valve during these gradual movements is not held from its seat sufficiently to pass an appreciable amount of gas. These gradual opening and closing movements have some times extended through approximately 30° of crankshaft rotation.

Such a cam design should be considered solely from the mechanical effect it will have upon the valve, valve seat, cam follower, etc., as in the initial opening and final closing of the valve the movement is so slight as to have no perceptible effect upon the volumetric flow of gas in and out of the cylinder. This is due to the fact that the valve position changes so very slightly during this 30° more or less of crankshaft rotation.

With a valve timing as outlined above it will be found that at certain periods in the engine cycle, namely, the last part of the exhaust stroke to the first part of the intake stroke both intake and exhaust valves are open at the same time for some 70° more or less but the opening is so slight as not to have any noticeable effect on the volumetric flow. It will also be noted that no radical departure from the standard compression ratio is used, as in this invention.

By reviewing the different phases of the operation at different speeds it will be seen that this invention makes possible the use of an extremely small compression chamber, which, combined with the peculiar operation of the intake valve, causes the engine to function most efficiently throughout a great range of speeds. The small compression chamber is made efficient at low speeds by permitting a portion of the original charge to be expelled before being compressed and thereby preventing over-compression and detonation and at the same time preserved that portion of the charge which has been ejected to be used in another charge. This is distinguished from the operation of conventional engines in which the compression space is necessarily larger to prevent over-compression and detonation and in which a full charge is trapped and used with a resulting waste of the fuel.

At high speeds all of the charge which is drawn into the cylinder is retained and due to the delayed intake closing a substantially greater charge can enter the cylinder than in prior types of engines, but where in other types of engines with a compression space of considerable size necessary to prevent detonation and excessive pressure at low speed this partial charge would not be sufficient to give the necessary compression for efficient operation, in the present invention the compression space may be so small that the partial charge induced at high speeds will be properly compressed therein and therefore cause the engine to operate more efficiently at high speeds and to attain far greater efficient speeds than has heretofore been possible.

An engine designed according to this invention will increase the thermal efficiency horse power, and general efficiency of all types of internal combustion engines, either for motor vehicles, marine, aviation, or stationary use. The design would be modified in form to suit various specific requirements, but the essential features will be noted throughout, those of reduced combustion chamber volume, delayed intake closing (or when the piston is approximately half way up on the compression stroke) and a rate of closing selected to restrict the flow of gas during the ejection stroke of the piston.

Whereas conventional engines now use a five to one or in some cases a six to one compression ratio, this principle allows of the practical use of compression ratios of seven or eight to one with conventional fuel without the difficulties now encountered in such engines. If desired even smaller combustion chambers can be used for example one in which the volume of the combustion chamber is only one-tenth of the combined volume of the piston displacement and combustion chamber. From this it is seen that an entirely new precedent can be established with relation to the size of the combustion chamber, without experiencing the difficulties now encountered in such practice.

The closing rate of the intake valve can vary widely within the scope of this invention, as for example where a relatively small valve is used or one with relatively small lift, the intake valve could be closed fairly rapidly with delayed closing and acquire the results herein described. On the other hand where a more efficient design is employed using a relatively large intake valve of substantial lift and relatively flat valve seat it will be found advisable to close the valve at a slower rate during the ejection stroke.

The invention is defined in the appended claim and is to be considered comprehensive of all forms of structure coming within its scope.

I claim:

In an internal combustion engine having a cylinder and a reciprocating piston, an intake valve, and means positively synchronized with the reciprocation of said piston for opening said intake valve and for holding the said valve open to a period when the piston has reached substantially mid-position of its compression stroke, said valve being open to a greater degree during its first half of movement than during its second half of movement for the purpose described.

ROBERT C. RUSSELL.